May 4, 1965　　　　　H. BENZLER　　　　　3,182,000
SHIELDING ARRANGEMENT FOR A SPHERICAL NUCLEAR REACTOR VESSEL
Filed Feb. 20, 1961
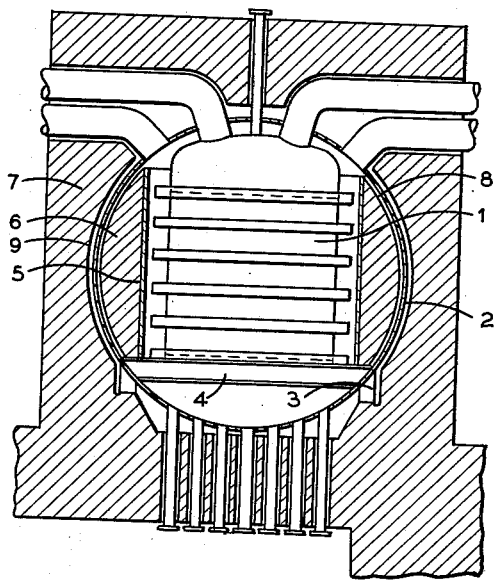
INVENTOR.
Hartwig Benzler
BY
ATTORNEY United States Patent Office 3,182,000
Patented May 4, 1965

3,182,000
SHIELDING ARRANGEMENT FOR A SPHERICAL NUCLEAR REACTOR VESSEL
Hartwig Benzler, Oberhausen, Rhineland, Germany, assignor to Babcock & Wilcox, Limited, London, England, a corporation of Great Britain
Filed Feb. 20, 1961, Ser. No. 90,488
Claims priority, application Germany, Feb. 25, 1960, D 32,735
1 Claim. (Cl. 176—40)

This invention relates to a spherical nuclear reactor vessel and more particularly to a shielding arrangement for a spherical nuclear reactor vessel.

Spherical reactor vessels have the drawback that the shielding they require must be dimensioned on the basis of the equator of the sphere. Insofar as the areas of the sphere above and below its equator are concerned, there is considerable waste of space between the sphere and the cylindrical or straight-sided shielding. For this reason, a cylindrical reactor-vessel design is often preferred in practice even through such a cylindrical vessel does not withstand internal pressures as well as a spherical vessel.

The object of the invention is to overcome this drawback of conventional designs. In accordance with the invention, this is to be accomplished by having an inner shield positioned between the wall of the spherical vessel and the sides of the core and an outer shield surrounding the vessel. The outer surface of the inner shield having a curved surface conforming to the adjacent vessel wall so that the horizontal cross-section of the outer shield is reduced by the amount of the corresponding horizontal cross-section of the inner shield. In a preferred embodiment of the invention, the outer surface of the inner shield is convex, and the opposite inner surface of the outer shield is concave, and the inner shield being sealed to prevent the infiltration of gases therethrough. Moreover, in accordance with the invention the outer surface of the inner shield may be cooled and its inner surface, the side facing the reactor, may be clad with a neutron-absorbing material.

Thus, in accordance with the invention the space between the outside of the reactor core and the inside of the spherical vessel is utilized to accommodate part of the biological shield. This permits that part of the biological shield located outside of the spherical reactor vessel to be correspondingly reduced in the vicinity of the equator of the sphere, and as a result the outside dimensions of the biological shield can be reduced and the over-all cost of the reactor structure slashed.

The various features of novelty which characterize the invention are pointed out with particularity in the claim annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawing there is shown a vertical sectional view of an embodiment of the invention in which a cylindrical reactor core 1 is enclosed within a spherical reactor pressure vessel 2 that is supported on a foundation 3. The reactor core 1 rests on a steel support grid 4. This grid 4 also carries a cylindrical wall 5 which laterally surrounds the reactor core and forms the inner surface of an inner-shield 6 located within the sphere formed of a solid material. An outer shield 7, also formed of a solid material, encloses the reactor vessel 2. As may be seen from the drawing, the inner shield has an outer surface 8 which is convex and the outer shield has an inner surface 9 which is concave; and the wall of the reactor vessel 2 is positioned between these surfaces.

In the drawing, the inner shield 6 is shown as having a segmental cross section. However, the outer surface 8 of the inner shield 6 may also be given a polygonal straight sided cross section.

It has been found advisable to prevent the infiltration of gases through the inner shield 6 to avoid undesired constituents entering the reactor coolant loop. The wall 5 which surrounds the reactor core may be treated with a high neutron-absorbing cross-section material, and a coolant may be made to flow over the outside of the inner shield 6, between its outer surface 8 and the wall of the vessel 2.

In erecting the reactor, the shell of the inner shield 6 is best inserted into the sphere first, and the shielding material afterwards. Following this, the reactor core 1 is put in place.

The invention is not, of course, confined to the embodiment described and shown, and may be modified without deviating from the idea underlying the invention. Thus, instead of using a cylindrical design, the reactor core may be square or rectangular. In that case uniform shielding at all points on the outer wall of the reactor can also be achieved at a moderate expenditure in materials of construction.

While in accordance with the provisions of the statutes there is illustrated and described herein a specific embodiment of the invention, those skilled in the art will understand that changes may be made in the form of the invention covered by the claim, and that certain features of the invention may sometimes be used to advantage without a corresponding use of the other features.

What is claimed is:

A nuclear reactor comprising walls forming a reactor vessel in the shape of a sphere, a vertically extending cylindrically shaped core disposed centrally within said vessel and spaced from the walls thereof, vertically extending biological shielding for said reactor comprising an inner shield formed of a solid material and having a varying horizontal cross section positioned within said vessel laterally enclosing said core and an outer shield formed of a solid material and having a varying horizontal cross section located laterally about said vessel and being coextensive with said inner shield, a cylindrically shaped wall closely spaced from the core and forming the inner surface of said inner shield, said wall containing a high neutron-absorbing cross-section material, the outer surface of said inner shield having a curved shape conforming to the adjacent wall of said vessel and spaced closely therefrom to form a coolant passageway therebetween, said inner shield sealed to prevent the infiltration of gases therethrough, and the inner surface of said outer shield positioned opposite said inner shield having a curved shape conforming to the adjacent wall of said pressure vessel whereby the combined horizontal cross-section dimension of said inner and outer shield is substantially uniform throughout the extent of the height of said inner shield.

References Cited by the Examiner
UNITED STATES PATENTS

| | | | |
|---|---|---|---|
| 2,837,477 | 6/58 | Fermi et al. | 204—193.2 |
| 2,928,779 | 3/60 | Weills et al. | 204—193.2 |
| 2,982,712 | 5/61 | Heckman | 204—193.2 |
| 2,988,522 | 6/61 | Smith et al. | 252—478 |

OTHER REFERENCES

Nucleonics, November 1957 (vol. 15, No. 11), page 85.

CARL D. QUARFORTH, *Primary Examiner.*

OSCAR R. VERTIZ, *Examiner.*